Patented Oct. 31, 1922.

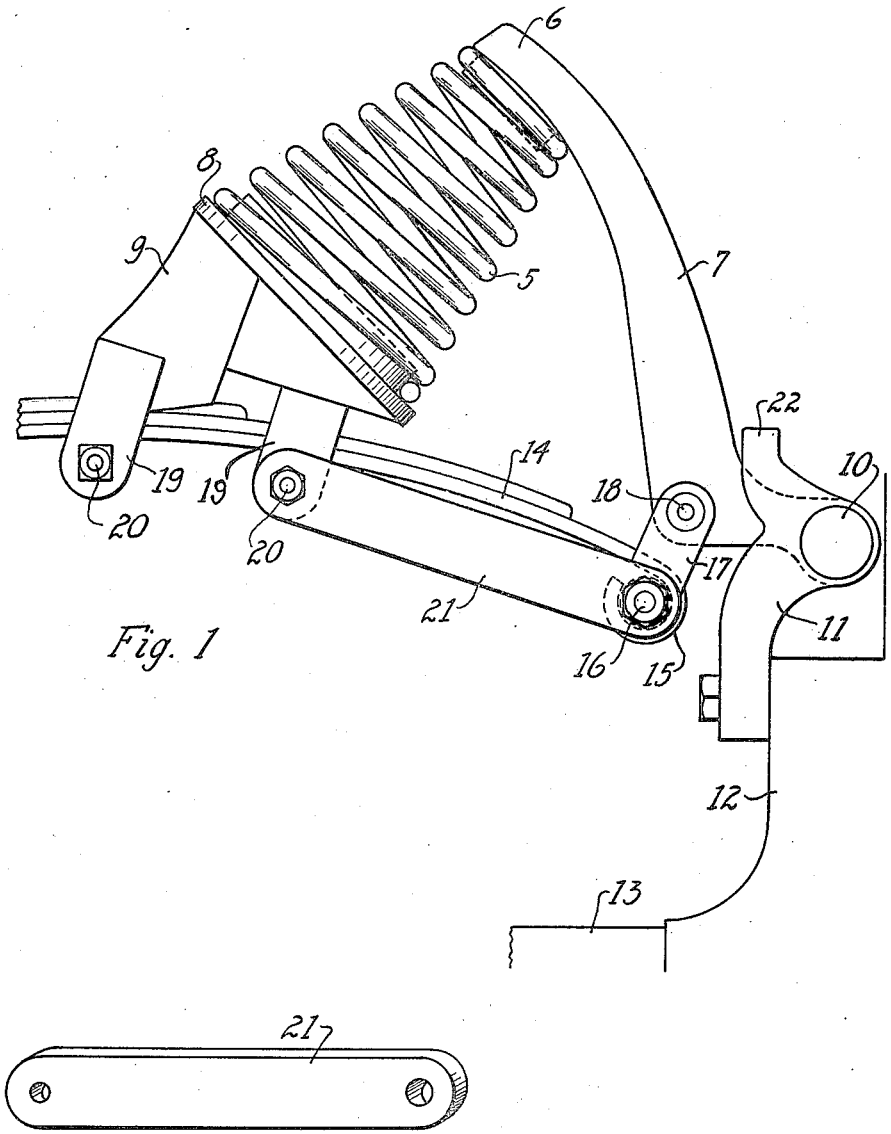

1,433,812

UNITED STATES PATENT OFFICE.

HARRY E. GLEASON, OF SHAMROCK, OKLAHOMA.

SHOCK ABSORBER.

Application filed February 23, 1921. Serial No. 447,032.

*To all whom it may concern:*

Be it known that I, HARRY E. GLEASON, a citizen of the United States, residing at Shamrock, in the county of Creek and State of Oklahoma, have invented certain new and useful Improvements in Shock Absorbers, of which the following is a specification.

This invention relates to shock absorbers and has for its object the production of suitable means for coacting with the springs of vehicles to prevent the effect of the rebound of the vehicle, or a portion thereof, when the spring has been materially strained, and also to increase the resilient effect of the springs of the vehicle.

Of the accompanying drawings Fig. 1 is an elevation of a shock absorber associated with the spring of the vehicle, which embodies the features of my invention; Fig. 2 is a perspective view of one element of the shock absorber.

It is common in case of vehicles, particularly automobiles, to provide some means for reducing the shock of the rebound of the vehicle when a sudden material jar causes the springs to be materially strained and then to spring backwardly carrying with it the body of the vehicle itself. One form of shock absorber used for this purpose is illustrated in Fig. 1, and comprises a compression spring 5 which is positioned between a plate 6 fixed to the outer end of a lever 7, and a plate 8 fixed to a base 9. The lever 7 is pivoted, by the pivot 10, to a bracket 11 which is fixed to some portion of the frame of the vehicle, such as the brake housing 12 which in turn is fixed to the axle 13. The spring 14 may be one of the main transverse springs of the vehicle, in the rear or the front as the case may be; and it has its end 15 pivoted, by means of a bolt 16, to a hanger 17, which is in turn pivoted by a pin 18, to the lever 7. The base 9, supporting the plate 8 of the lower end of the compression pin 5, is slidably mounted on the spring 14 by means of pairs of lugs 19 projecting from the base 9, on each side of the spring 14, and having bolts 20 connecting the lower ends of each pair of lugs.

It is common with such shock absorbers to depend upon the lugs 19 and the bolts 20 to maintain substantially in place the base 9, and hence the lower end of the spring 5. But as the constant operation of the springs 14 and 5 tend to displace the base 9, with reference to the spring 14, I provide as my invention a link 21 which connects the bolt 16 with one of the bolts 20, and thereby at all times prevents the abnormal displacement of the base 9.

In operation the arm 7 is limited in its rotating upward movement by a stop 22, fixed to the bracket 11; and in case of the tendency of the vehicle or any portion thereof to be forced upwardly by the rebound of the spring 14 the arm 7 is held from backward movement by the stop 22, and the resulting compression of the spring 5 gradually stops the upward movement of the vehicle, thus overcoming the strain on the vehicle due to the ordinary method of stopping the upward movement of the vehicle. By the use of the link 21 the distance between the base 9 and the end 15 of the spring is always maintained such as to produce the best result with the spring 5, keeping its axis in line with the axis of both plates 6 and 8; while otherwise more or less creeping of the base 9 would result, and such an abnormal displacement of the base would necessitate a readjustment thereof. Also the base may be slidably mounted on the spring 14, so that, as the spring, changes form, the base may slide freely thereon to accommodate the spring 5.

I claim as my invention:

A vehicle spring and a shock absorber therefor, said absorber comprising a baseplate slidably mounted on and above the spring, lugs projecting from said plate and extending on each side of and below said spring, the lower end of each of said lugs having an opening therethrough below said spring, a bolt passing through said opening, an arm arranged to be pivoted to the frame of the vehicle, a compression spring positioned between the free end of said arm and said base-plate, and a hanger pivoted to said arm and to one end of said spring; in combination with a link pivoted to one of said lugs and to said hanger.

In testimony whereof, I hereunto set my hand.

HARRY E. GLEASON.